(12) United States Patent
Weinberg et al.

(10) Patent No.: US 7,745,000 B2
(45) Date of Patent: Jun. 29, 2010

(54) SURFACE-MODIFIED PLEXIFILAMENTARY STRUCTURES, AND COMPOSITIONS THEREFOR

(75) Inventors: Mark Gary Weinberg, Wilmington, DE (US); Gregory T. Dee, Wilmington, DE (US); Jose Manuel Rodriguez-Parada, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/072,823

(22) Filed: Feb. 28, 2008

(65) Prior Publication Data

US 2008/0153987 A1 Jun. 26, 2008

Related U.S. Application Data

(63) Continuation of application No. 10/668,491, filed on Sep. 23, 2003, now abandoned.

(60) Provisional application No. 60/413,315, filed on Sep. 25, 2002.

(51) Int. Cl.
*D02G 3/02* (2006.01)
(52) U.S. Cl. ........................ 428/400; 428/364; 428/365; 428/397
(58) Field of Classification Search ................. 525/165, 525/167, 168, 169, 170, 171, 175, 176, 177, 525/191, 192, 193, 194, 197, 199, 206, 209, 525/418, 419, 437, 444, 445; 428/364, 365, 428/397, 400
See application file for complete search history.

(56) References Cited

U.S. PATENT DOCUMENTS

| | | | |
|---|---|---|---|
| 3,081,519 A | 3/1963 | Blades et al. | |
| 3,169,899 A | 2/1965 | Steuber | |
| 3,227,784 A | 1/1966 | Blades et al. | |
| 3,412,175 A | 11/1968 | Magat et al. | |
| 3,442,740 A | 5/1969 | David | |
| 3,728,151 A | 4/1973 | Sherman et al. | |
| 3,917,725 A | 11/1975 | Hazeldine et al. | |
| 4,254,238 A | 3/1981 | Foss et al. | |
| 4,584,347 A | 4/1986 | Harpell et al. | |
| 5,141,661 A * | 8/1992 | DeRosa et al. | ............... 508/224 |
| 5,372,885 A | 12/1994 | Tabor et al. | |
| 6,004,672 A | 12/1999 | Shin et al. | |
| 6,096,421 A | 8/2000 | Waggoner et al. | |
| 6,136,911 A | 10/2000 | Shin et al. | |
| 6,218,460 B1 * | 4/2001 | Shin et al. | .................... 524/546 |
| 6,338,772 B1 | 1/2002 | Nakagawa et al. | |
| 6,458,304 B1 | 10/2002 | Shin et al. | |
| 2002/0072571 A1 | 6/2002 | Cohen et al. | |
| 2003/0039834 A1* | 2/2003 | Gunn | ......................... 428/375 |
| 2005/0090633 A1* | 4/2005 | Chou et al. | ................. 526/242 |

FOREIGN PATENT DOCUMENTS

| | | |
|---|---|---|
| EP | 0482882 | 4/1992 |
| EP | 0 997 494 | 5/2000 |
| JP | 1996118526 | 5/1996 |
| JP | 2002-76356 | 3/2002 |
| WO | WO 97/25459 | 7/1997 |
| WO | WO 97/25460 | 7/1997 |
| WO | WO 97/25461 | 7/1997 |
| WO | WO 03/076483 A2 * | 9/2003 |

OTHER PUBLICATIONS

Kirk-Othmer, Encyclopedia of Chemical Technology, 4th edition, pp. 353-355, vol. 17.

* cited by examiner

*Primary Examiner*—Michael J Feely

(57) ABSTRACT

The present invention is concerned with flash-spinning a surface-modified structure such as a plexifilimentary yarn or a microcellular foam.

14 Claims, 1 Drawing Sheet

SURFACE-MODIFIED PLEXIFILAMENTARY STRUCTURES, AND COMPOSITIONS THEREFOR

This is a continuation application of U.S. Ser. No. 10/668,491 (now abandoned), filed Sep. 23, 2003, which claims benefit of U.S. provisional application No. 60/413,315, filed Sep. 25, 2002.

FIELD OF THE INVENTION

The present invention is concerned with flash-spinning a surface-modified structure such as a plexifilimentary yarn or a microcellular foam.

BACKGROUND OF THE INVENTION

As described in *Kirk-Othmer Encyclopedia of Chemical Technology*, Fourth Edition, volume 17, pages 353-355, the term "plexifilamentary yarn" refers to a yarn or strand characterized by a morphology substantially consisting of a three-dimensional integral network of thin, ribbon-like, film-fibril elements of random length that have a mean film thickness of less than about 4 microns and a median fibril width of less than 25 microns, and that are generally coextensively aligned with the longitudinal axis of the yarn. In plexifilamentary yarns, the film-fibril elements intermittently unite and separate at irregular intervals in various places throughout the length, width and thickness of the yarn thereby forming the three-dimensional network.

A plexifilimentary yarn is produced by flash-spinning of polyethylene or other polymers. Flash spinning is well-known in the art as a process for preparing plexifilimentary yarns and the non-woven fabrics made therefrom, as well as microcellular foams. Whether a plexifilimentary yarn or a microcellular foam is obtained depends upon the particulars of the spinning process, as described below. In flash-spinning, a polymer, usually polyethylene, is dispersed in a non-solvent, known as a spin agent. The dispersion so formed is then subject to elevated temperature and pressure to form a homogeneous solution, and the solution is then fed to an orifice at lower pressure. At the orifice, the highly pressurized solvent phase separates and rapidly vaporizes, leaving behind a unique three dimensional structure which may be a plexifilimentary yarn or a microcellular foam.

The morphology of, and means for preparing, a plexifilimentary yarn and a microcellular foam are described in detail in U.S. Pat. No. 3,081,519, which is incorporated in its entirety as a part hereof. The use of plexifilimentary yarns in the formation of non-woven fabrics is described in U.S. Pat. No. 3,169,899 and U.S. Pat. No. 3,442,740. Plexifilamentary yarns have found widespread commercial value primarily in the form of flash-spun high density polyethylene non-woven fabrics, most notably Tyvek® non-woven fabric, which is manufactured by the DuPont Company.

There have been numerous reports in the art of efforts directed at achieving one or another modification of the properties of flash-spun polyethylene by employing other polymers, either alone or in combination with polyethylene. For example, U.S. Pat. No. 6,004,672 discloses flash-spinning of blends of polyethylene and polypropylene. In another example, U.S. Pat. No. 6,136,911 discloses flash-spinning of blends of partially fluorinated copolymers such as polyvinylidene fluoride or ethylene/tetrafluoroethylene with 12-30% by weight of polyethylene.

In another approach to achieving modified properties in flash spun polyethylene, GB 891,944 discloses radiation induced grafting of so-called organic modifiers on to the surface of plexifilimentary yarns and non-woven fabrics produced therefrom. Suitable organic modifiers include ethylenically unsaturated monomers, including fully and partially fluorinated monomers. Also included are unsaturated and saturated polymers. In U.S. Pat. No. 6,096,421, a maleic anhydride grafted polyethylene was used as a modifier for ethylene/vinyl alcohol copolymer.

SUMMARY OF THE INVENTION

The present invention provides a surface-modified plexifilimentary structure, such as a plexifilimentary yarn, a microcellular foam or a non-woven fabric, and compositions and processes useful in preparing such structures. A useful composition contains a polymer having 1 to 25 mol % of pendant functional groups.

The present invention further provides a process for forming a spin mixture containing a spin agent and a polymer mixture by combining 0 to 95% by weight of a first polymer and 5 to 100% by weight of a second polymer, pressurizing the spin mixture to a pressure above the autogenous pressure thereof, and extruding the mixture through an aperture into a region at a pressure which is below the autogenous pressure of the spin mixture at a temperature such that the spin agent vaporizes upon exposure thereto; the first polymer being selected from the group consisting of polyolefins, copolymers thereof with ethylenically unsaturated monomers, polyesters, and mixtures thereof; and the second polymer being selected from the group consisting of polyolefins, copolymers thereof with ethylenically unsaturated monomers, polyesters, and mixtures thereof; the second polymer further containing 1 to 25 mol % of pendant functional groups.

Further provided by the present invention is a mixture comprising a spin agent selected from the group consisting of aliphatic hydrocarbons, fluorocarbons, halogenated hydrocarbons, and hydrofluorocarbons, and a polymer mixture containing 0 to 95% by weight of polyethylene or polyethylene terephthalate and 5 to 100% by weight of a functional polymer, the functional polymer being polyethylene or polyethylene terephthalate having 1 to 25 mol % of pendant functional groups selected from the group consisting of fluorocarbon radicals and oxyethylene radicals.

DETAILED DESCRIPTION OF THE INVENTION

Figure 1:
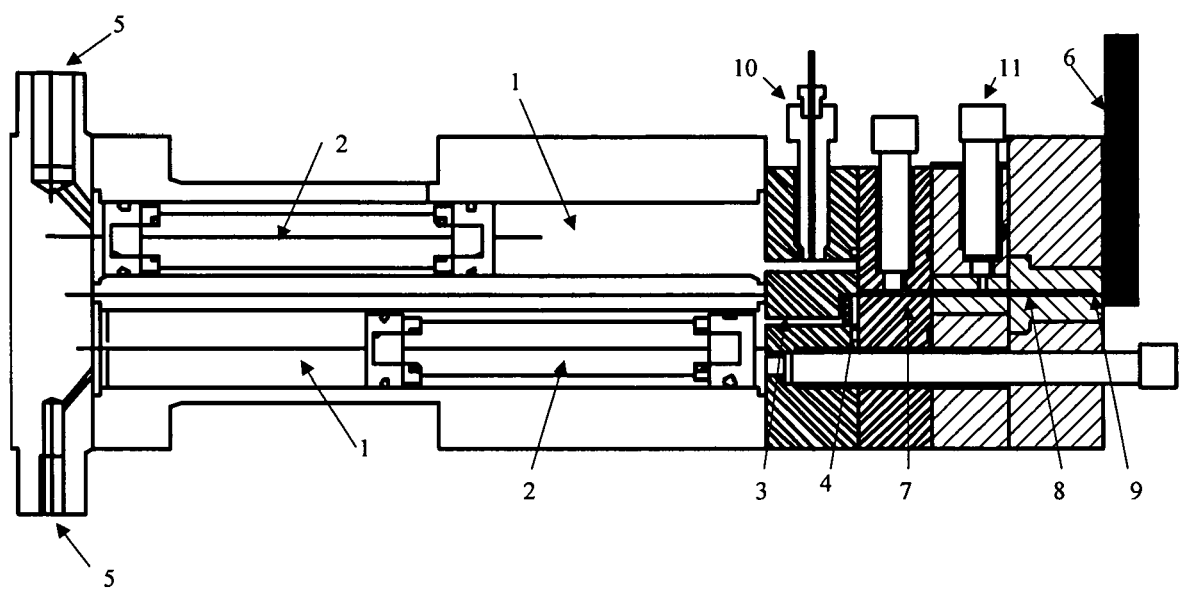
FIG. 1 is a side elevation view of a flash spinning apparatus.

The present invention provides a method for introducing non-fugitive surface modifications to flash spun structures, most particularly flash-spun polyethylene. It is particularly surprising that the flash-spun plexifilimentary yarns produced in certain embodiments of the present invention exhibit surface concentrations of the surface modifying species of approximately 10-fold higher than the bulk concentration thereof. The method of the present invention is widely applicable for modifying the surface of flash-spun plexifilimentary yarns to provide a vast array of possible functionality thereto.

In one embodiment, a reduced surface tension is provided in a flash-spun structure having a high concentration of fluorine resident upon the surface. In another embodiment, improved adhesion is provided in a flash-spun structure having high oxygen concentration on the surface. Numerous other embodiments are also envisioned. These include flash-spun structures having biologically active surfaces. For example, the second polymer may be provided with a pendant group comprising a vitamin, a pharmaceutical or a nutrient. In further embodiments, the second polymer may be provided with a pendant group comprising acid-dyeable dye-sites. In a still further embodiment, the second polymer may be provided with a pendant group comprising a herbicide, a fungicide or an antibiotic. In yet a further embodiment the second polymer is provided with an epoxide functionality or other functionality which will react with amino groups to immobilize a protein on the surface. In every case, the functionality provided to the surface is built into the polymer structure itself by the attached pendant group, and is non-fugitive.

For the purposes of this invention the term "functional group" and related terms such as "functionality" refer to a chemical group which provides some function to the surface of the flash-spun structure which would not be provided in the absence of the functional group—that is, by the polymer backbone having no or merely a chemically similar pendant group. It is a particularly surprising aspect of this invention that having the desired functionality in the pendant group provides for excellent processability and highly concentrated localization of the desired functionality on the surface of the flash-spun structure. The term "functional polymer" refers to the second polymer of the invention—a polymer possessing a pendant group provided with some specific functionality according to the present invention.

The flash spun structures provided according to the process of this invention may be either plexifilimentary yarns or microcellular foams.

In the present invention, a mixture is formed by combining about 0 to 95%, preferably about 70 to 95%, most preferably about 75 to 90% by weight of a first polymer, and about 5 to 100%, preferably about 5 to 30%, most preferably about 10-25%, by weight of a second polymer. Under most circumstances the second polymer will be more costly than the first polymer so that it will generally be desirable to employ the least amount of the second polymer consistent with achieving the desired surface effect. In this invention, the desired effect is often realized when the second polymer is present in the range of about 5-30%, preferably about 10-25%, by weight.

One of the surprising benefits of this invention when the second polymer represents about 5-30%, preferably about 10-25%, by weight of the total weight of polymer, is the surprisingly high percentage of the surface modifying agent which is resident upon the surface, as indicated by the very high ratio of surface to bulk concentration of the surface modifying agent. This highly desirable result may not be achieved if the second polymer represents all or nearly all of the spinning composition employed. Thus, while the invention is operable at or near 100% of the second polymer, the maximum benefit provided by the invention may not be realized at that level of second polymer.

The first polymer may be an addition polymer or a condensation polymer. Among addition polymers, the polyhydrocarbons, particularly linear polyethylene and polypropylene, are preferred. Other types of polyethylene, including low density polyethylene and linear low density polyethylene are also included. Other addition polymers that could be used include polymethylpentene, copolymers with ethylenically unsaturated comonomers such as acrylates and acrylic acids including methacrylic acid, methyl acrylate, methylmethacrylate, ethylene vinyl acetate and polyacrylonitrile. Condensation polymers suitable for the practice of the present invention include polyamides, polyesters, polyacetals, polyurethanes and polycarbonates. Suitable polyesters include, but are not limited to, polyethylene terephthalate (2GT polyester), polypropylene terephthalate (3GT polyester), polybutylene terephthalate (4GT polyester), polybutylene napthalate, polyethylene napthalate, and recycled 2GT and 4GT polyesters. Preferred polymers include polyolefins such as polyethylene, polypropylene and their copolymers and polyesters. Preferred for use as the first polymer of the invention are polyethylene and polyethylene terephthalate, with high density polyethylene being most preferred.

Depending upon the particular properties desired, it may be found advantageous to incorporate into the spinning composition minor amounts of other polymers such as but not limited to branched polyethylene, polypropylene, polybutene, polyisobutylene, polybutadiene, polyvinyl chloride, or cellulose acetate.

Polyolefins suitable for use as the first polymer in the present invention are characterized by a melt index of about 0.3-30 g/10 minutes according to ASTM D-1238E, with a melt index of about 0.5 to 10 preferred. Polyesters suitable for use as the first polymer in the present invention are characterized by an intrinsic viscosity of about 0.5 to 2.5, preferably about 1.0 to 1.7, as determined in a 0.5% solids solution in a 1:1 mixture of phenol and tetrachloroethane at 20° C.

The second polymer may be one or more of a polyolefin, a copolymer thereof with ethylenically unsaturated monomer(s) and a polyester, and contains about 1 to 25 mol %, preferably about 5 to 15 mol %, of pendant functional groups. The desired functional group should be susceptible to modification to provide a locus for attachment to the hydrocarbon backbone of the second polymer, and the functional group should not undergo degradation, cross-linking or other undesirable reaction during the flash-spinning operation. The percentage of pendant groups which can be incorporated into the second polymer will vary considerably with the particular pendant group. Thus, when ethylenically unsaturated fluoroolefins are grafted onto a polyethylene polymer (as described below), as many as about 25 mol % of the methylene groups may serve as a grafting site. However, with other species, such as maleic anhydride, fewer of the methylene groups, such as about 4 mol %, may serve as a grafting site.

Preferred pendant groups are fluorinated olefin radicals and oxyethylene trimer. It will be appreciated that the oxyethylene will be associated with improvements in adhesion while the fluorinated olefin radicals will be associated with decreased surface wettability. In a further preferred embodiment, the backbone chain from which the functional groups are pendant is polyethylene.

In a preferred embodiment, the spin mixture of the invention is a mixture comprising a spin agent selected from the group consisting of aliphatic hydrocarbons, fluorocarbons, halogenated hydrocarbons, and hydrofluorocarbons, and a polymer mixture comprising about 0 to 95% by weight of polyethylene or polyethylene terephthalate, and about 5 to 100% by weight of a functional polymer, the functional polymer being polyethylene or polyethylene terephthalate and containing about 1 to 25 mol % of pendant functional groups selected from the group consisting of fluorocarbon radicals and oxyethylene radicals.

One method for preparing the functionalized polymer suitable for the practice of the present invention is by free-radical grafting. Suitable graft copolymers can be formed by free radical attack on polymers having abstractable hydrogens along the backbone. Particularly suitable are polymers having at least about 50 mol % of methylene units in the polymer backbone. Most olefinic polymers are suitable. Preferred are polyethylene, polypropylene, and their copolymers, as well as copolymers of ethylene with acrylates, methacrylates and vinyl acetate, and terpolymers thereof. Polyethylene is the most preferred.

The free-radical grafting reaction is conveniently performed in a solvent such as chlorobenzene, dichlorobenzene, trichlorobenzene or dimethyl acetamide at a temperature in the range of from about room temperature (~25° C.) to 250° C., depending on the solubility of the polymer and the decomposition temperature of the initiator. The most preferred range is between about 80° C. and 130° C. An inert atmosphere is necessary to avoid reaction of the free radicals with oxygen. Nitrogen and argon are suitable atmospheres. Preferably, the source of free radicals is a free-radical initiator, suitable examples including inorganic peroxides and organic peroxides and azo compounds. Organic peroxides are preferred; tert-butyl peroxide and dicumyl peroxide are most preferred. The amount of initiator used is between about 1 and 20 wt % of the polymer, preferably from about 5 to 10 wt %.

A suitable polymer, having a weight average molecular weight in the range of about 3,500 to 1,000,000 Daltons, preferably about 8,000 to 250,000 Daltons, is combined in a suitable solvent with a suitable initiator, and one or more grafting monomers. Preferred grafting monomers are non-homopolymerizable monomers, that is, the grafting monomers do not appreciably polymerize in the presence of free radicals, although some lower oligomerization might occur. The second polymer may thus be a grafted polymer that is grafted with about 1 to 25 mol %, preferably about 5 to 15 mol %, pendant functional groups, the pendant functional groups being chain-grafted to the main chain of the second polymer.

Monomers suitable for grafting to form the second polymer include fluoroolefins, oxyethylenes, disubstituted ethylenes such as maleic anhydride, and vinyl silanes. Preferred monomers include perfluoroalkyl olefins such as tetrafluoroethylene, hexafluoropropylene, or perfluoroalkyl ethylenes; perfluorinated vinyl ethers such as perfluoro methyl, ethyl, or propyl vinyl ether. Particularly preferred are substituted perfluorovinyl ethers having the formula $$CF_2=CF-O-[CF_2CF(R_f)O]_n-CF_2CF_2-Q$$

wherein $R_f$ is F or a fluoroalkyl radical having 1 to 6 carbons, n=0 to 2, and Q may be $-SO_2X$ or $-Y$ wherein X represents F or $-O^-M^+$ where $M^+$ is hydrogen or alkali metal, and Y represents $-CH_2OH$, $-CN$, $-CONH_2$, or $COO^-M^+$ wherein $M^+$ is hydrogen or alkali metal. It may be found convenient to first graft a nonionic monomer and then hydrolyze after grafting to the ionic forms.

Also suitable are disubstituted ethylenes such as maleic anhydride and its esters; vinyl silanes containing alkyl, alkoxy, phenyl, halo (especially chloro), and hydrogen substituents or any combination of these; and terminal olefins containing more than 4 carbon atoms including olefins containing any functional group that does not interfere with the grafting reaction, such as halogen, ether, carboxylic acid and ester.

Another method for preparing functionalized polymers suitable for the practice of this invention involves transesterification of acrylic polymers, preferably copolymers of ethylene with acrylic or methacrylic ester monomers, most preferably ethylene-methyl acrylate and ethylene-methyl methacrylate copolymers, containing from about 2 to 30 weight % acrylic monomer. In this method the polymer is reacted with an alcohol to introduce functional side groups in the polymer, according to the reaction

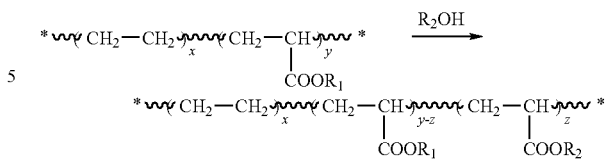

The transesterification reaction is conveniently performed in a solvent such as trichlorobenzene in a temperature range from about 100 to 250° C. The most preferred range is between about 180 and 220° C. An inert gas sweep conveniently carries away the low boiling alcohol byproduct. Nitrogen and argon are suitable inert gases. Typical transesterification catalysts such as Lewis acids are suitable for the reaction. Preferred catalysts include titanium(IV) n-butoxide. The alcohol used for this transformation depends on the functionality wanted on the polymer. For example, fluorinated alcohols will impart hydrophobic and oleophobic properties, while alcohols containing polar groups will give hydrophilic polymers. Suitable alcohols include most high boiling alcohols. Preferred alcohols include 2-perfluoroalkylethyl alcohols, 1-perfluoroalkylmethyl alcohols, 2-ethoxyethanol, di(ethylene glycol) monoethyl and monomethyl ethers, and tri(ethylene glycol) monoethyl and monomethyl ethers.

Of course, the second polymer can be formed simply by copolymerization of a suitably functionalized olefin monomer with an olefin such as ethylene, propylene, and/or other olefins.

Although this invention is directed primarily to modification of the surface of flash spun yarns in order to alter the wettability and adhesion properties thereof, numerous other functionalities can be incorporated in the pendant group of the second polymer, thereby imparting other, novel, properties to the flash spun product. Included among these are acid-dye receptor sites; incorporation of fluorosulfonyl fluoride groups which, after flash spinning, can be readily hydrolyzed according to methods known in the art to provide ion exchange or super acid catalyst sites; incorporation of quaternary ammonium functional groups to provide biocide functionality; and incorporation of amine, carboxylic acid, epoxy or tosyl functional groups to immobilize proteins on the surface of the yarn.

The second polymer is combined in a suitable spin agent with the first polymer, a flash spinnable polymer, to form a spin mixture having a second polymer concentration of about 5-30% by weight of the total spin composition, preferably about 10 to 25% by weight.

The first and second polymers may be combined prior to incorporation into the spin agent to form a blend by various means known in the art, including both melt blending and so-called dry blending or tumbling. However, it is generally satisfactory to combine the first and second polymers in the step in which the two are mixed with the spin agent to form the spin mixture. In a typical embodiment, the spin mixture contains about 5-30% solids, the precise amount being determined by such considerations as the molecular weight of the polymer, the choice of spin agents, and the particular spinning conditions.

Suitable spin agents include aromatic hydrocarbons such as benzene and toluene; aliphatic hydrocarbons such as butane, pentane, octane, and their isomers and homologues; alicyclic hydrocarbons such as cyclohexane; unsaturated hydrocarbons; halogenated hydrocarbons such as trichlorofluoromethane, methylene chloride, carbon tetrachloride, chloroform, ethyl chloride, and methyl chloride; alcohols; esters; ethers; ketones; nitrites; amides; fluorocarbons; hydrofluorocarbons; hydrochlorofluorocarbons; inert gases such as sulfur dioxide and carbon dioxide; carbon disulfide; nitromethane; water; and mixtures of the above liquids. Preferred spin agents for use with polyolefins are aliphatic hydrocarbons and fluorocarbons. Preferred spin agents for polyesters are halogenated hydrocarbons and hydrofluorocarbons. Co-spin agents can also be used in conjunction with these primary spin agents to improve electrostatic charging and/or to reduce solvent power.

Examples of other suitable spin agents are set forth in U.S. Pat. Nos. 3,081,519 and 3,227,784, including those having characteristics such as: (a) the spin agent should have a boiling point at least 25° C. and preferably at least 60° C. below the melting point of the polymer used; (b) the spin agent should be substantially unreactive with the polymer during mixing and extrusion; (c) the spin agent should be a solvent for the polymer under the conditions of temperature, concentration and pressure used in the process; (d) the spin agent should dissolve less than 1% of high polymeric material at or below its boiling point; and (e) the spin agent should form a solution which will undergo rapid vaporization upon extrusion, forming a nongel polymer phase (i.e., a polymer phase containing insufficient residual liquid to plasticize the structure).

Common additives, such as antioxidants, UV stabilizers, dyes, pigments, and other similar materials can be added to the spin composition prior to extrusion.

The spin mixtures utilized in this invention may be formed and flash-spun by any convenient technique taught in the art. In one embodiment, the polymer mixture may be mechanically dispersed in a mixture of carbon dioxide and water at a temperature of at least 130° C., as more particularly described in U.S. Pat. No. 5,192,468. In another embodiment, plexfiilmentary material is produced by first continuously supplying under pressure, into a dissolution zone, synthetic crystallizable organic polymer of filament forming molecular weight and an inert solvent for the polymer, the concentration of polymer being 2 to 20% by weight of the solution. The polymer is dissolved in the zone, and a polymer solution is produced having a temperature of at least the solvent critical temperature minus 45° C. and a pressure above the two-liquid-phase pressure for the solution. Thereafter the solution is forwarded through a transfer zone while maintaining a heat balance at substantially the same level as in the dissolution chamber. A constant pressure above the two-liquid-phase pressure is maintained in the transfer zone by control means such that the total supply of polymer and solvent to the dissolution zone is varied inversely in relation to the pressure in the transfer zone, as more particularly described in U.S. Pat. No. 3,227,794. In still another embodiment, flash spinning may be accomplished by a process of entraining a web in a gaseous stream flowing in a generally horizontal path toward one location on a baffle, directing and oscillating said web and said stream from said one location in a plurality of downward radial directions in a substantially vertical plane through ambient gas toward a collecting means, electrostatically charging the web, and collecting said web on said collecting means as a fibrous sheet, converging said stream below said baffle in said downward radial directions within a shield presenting substantially equal flow impedances in said radial directions for a distance of from 30 to 60 percent of the distance from said one location to said collecting means thereby maintaining the stream entrained web substantially as formed by said baffle and preventing premature mixing with said ambient gas, as more particularly described in U.S. Pat. No. 3,851,023. Each of the above mentioned patents is incorporated as a part hereof.

As discussed below, the morphology of the fiber strands obtained by flash spinning of blended polymers is greatly influenced by the spin agent in which the polymers are combined, the concentration of the polymers in the spin solution, and the spin conditions, such as temperature and pressure.

Flash spinning a single polymer may be accomplished by forming a dispersion of the polymer in a spin agent which is a non-solvent at ambient pressure and temperature but which dispersion forms a solution with the application of sufficient heat and pressure. The pressure is subsequently decreased and the solution becomes cloudy as separation occurs into a polymer-rich phase and a solvent-rich phase. The pressure at which the separation occurs is referred to as the "cloud point pressure". The cloud point pressure, which is directly dependent on the choice of the polymer and solvent, the total polymer concentration, and the temperature, can be anywhere between the autogenous pressure of the solvent (i.e., the solvent vapor pressure at a given temperature) and about 50 MPa. The cloud point of a single polymer solution may be readily ascertained visually, and is a handy visual reference for determining optimum conditions for flash spinning.

In this invention, it is desirable that both the first and second polymers hereof be soluble in a common solvent at elevated temperature and pressure. However, the first and second polymers are sometimes not mutually soluble to any significant degree, i.e. they are incompatible, resulting in phase separation even when each polymer separately dissolves in the common solvent. Therefore, such combinations always exist as a dispersion of one polymer solution in another. Any resulting solution will be cloudy under most processing conditions of interest. Therefore, there is no "true" cloud point pressure for these blends in a common solvent.

In this invention, the cloud point of each individual component is separately determined. The spin composition formed as a polymer blend is mixed at a pressure higher than the cloud point pressure of the component with the higher individual cloud point pressure, thereby resulting in a two-phase mixture, one rich in the first polymer and one rich in the second polymer. That is to say, the spin mixture is two-phase at the first pressure. Then, the spin mixture is subjected to a second pressure that is lower than the first pressure but is still higher than the autogenous pressure of the mixture, and at the second pressure the solution phase separates into a three-phase system, two polymer-rich phases and a solvent rich phase. It is possible to introduce the spin mixture into the flash-spinning nozzle directly from the first pressure state and thereby spin a plexifilimentary yarn. However, it is preferred to introduce a second intermediate pressure stage, still well above ambient pressure, at which a new solvent-rich phase develops, and to introduce the spin mixture into the flash-spinning nozzle from the second intermediate pressure stage.

A mixture of more than two polymers may also be flash-spun in this invention. In such a case, the spin mixture will include however many polymer-rich phases as there are polymers. There will be practical limits to how many incompatible phases can be processed, and there will be practical limits to how many polymers are soluble in a common solvent. But there are no fundamental limitations to the number of polymers that can be combined according to the process of the invention. For the purposes of clarity, the description herein is directed to a binary mixture, but the methods herein described are equally applicable to mixtures of more than two polymers.

The optimum spin pressure will dictated primarily by the spin agent chosen, the polymer concentration, the temperature, and the specific process parameters and apparatus; geometry. It has been found that optimum flash spinning pressure for the polymer blend of this invention is usually closer to that associated with the polymer that is present at the higher concentration in the blend, hereinafter referred to as "the major component." The pressure range is preferably between the autogenous pressure of the spin mixture and 15 MPa. The most preferred spin pressure range to produce well-fibrillated plexifilaments lies between the cloud point pressure of the major polymeric component, and 3 MPa lower than the cloud point pressure of the major component.

In this invention, a suitable temperature range for flash spinning is 150 to 300° C., with the optimum temperature for a lower melting and/or more soluble polymer typically being lower than that for a higher melting and/or less soluble polymer. The most preferred spin temperature range to produce well-fibrillated plexifilaments is between the critical temperature of the spin agent and 40° C. below the critical temperature of the spin agent. The critical temperature is that temperature above which a gas cannot be liquefied by pressure alone.

To obtain plexifilaments, the total polymer concentration in the spin composition is kept relatively low, e.g., less than about 35% by weight, preferably less than about 30% by weight. The concentration also needs to be greater than about 5% by weight in order to avoid the formation of discontinuous fibers. As indicated, the spin temperatures and pressures are generally kept high to provide rapid flashing of the solvent. Microcellular foam fibers, on the other hand, are usually prepared at relatively high total polymer concentrations, between about 35 and 70% by weight. In addition, lower spin temperatures and pressures are used compared to those used to obtain plexifilaments.

In a further embodiment of the process of the invention, it has been found that when a plexifilimentary yarn produced by the process hereof is subject to elevated temperature, the surface enrichment effect of the present invention is further enhanced, as seen in the specific embodiments described below. The duration and temperature will depend upon the specific compositions involved. On the laboratory scale, heating to a temperature in the range of about 100-150° C. for a period of 15 seconds to a minute has been found to be satisfactory.

The advantageous effects of this invention are demonstrated by a series of examples, as described below. The embodiments of the invention on which the examples are based are illustrative only, and do not limit the scope of the invention. The significance of the examples is better understood by comparing the results obtained from these embodiments of the invention with the results obtained from certain formulations that are designed to serve as controlled experiments since they do not possess the distinguishing features of this invention.

EXAMPLES

The flash spinning apparatus employed herein is described in detail in U.S. Pat. No. 5,147,586. The apparatus, shown in FIG. 1, consists of two high-pressure cylindrical chambers (1), each equipped with a piston (2) which is adapted to apply pressure to the contents of the chamber. The cylinders have an inside diameter of 1.0 inch (2.54 cm) and each has an internal capacity of 50 cubic centimeters. The cylinders are connected to each other at one end through a 3/32 inch (0.23 cm) diameter channel (3) and a mixing chamber (4) containing a series of fine mesh screens that act as a static mixer. Mixing is accomplished by forcing the contents of the vessel back and forth between the two cylinders through the static mixer. The pistons are driven by high-pressure water supplied by a hydraulic system (5). A spinneret assembly with a quick-acting means for opening the orifice (6) is attached to the channel through a tee (7). The spinneret assembly consists of a lead hole (8) of 0.25 inch (0.63 cm) diameter and about 2.0 inch (5.08 cm) length, and a spinneret orifice (9) with a length and a diameter each measuring 30 mils (0.762 mm).

In the examples, the polymer was charged into one cylinder. In the case of the blends, both polymers were added simultaneously as either pellets or powder to make a "salt and pepper"-type blend. In all cases, 0.1 wt % (based-on-solvent) Weston® W619F antioxidant (General Electric Specialty Chemicals) was also added. The spin agent was added by a high pressure screw-type generator (High Pressure Equipment Co.), calibrated to give 0.7 cc/turn. High-pressure water was used to drive the pistons to generate a mixing pressure of between 2000 and 4000 psig (13.8-27.6 MPa).

The polymer and spin agent were then heated to mixing temperature, as measured by a type J thermocouple (10, Technical Industrial Products Inc. of Cherry Hill, N.J.) and held at that temperature for a specified period of time during which the pistons were used to alternately establish a differential pressure of about 1500 psi (10.3 MPa) or higher between the two cylinders. This action repeatedly forced the polymer and spin agent through the mixing channel from one cylinder to the other to provide mixing and to effect formation of a spin mixture. The spin mixture temperature was then raised to the final spin temperature, and held there for a time sufficient to equilibrate the temperature, usually 5 minutes, during which time mixing was continued. The time at temperature was kept as short as possible to minimize thermal degradation of the polymer or the spin agent.

The pressure of the spin mixture was reduced to the desired spinning pressure just prior to spinning. This was accomplished by opening a valve between the spin cell and a much larger tank of high-pressure water ("the accumulator") held at the desired spinning pressure. The spinneret orifice was opened as soon as possible (usually about one to two seconds, except that Example 6 was held for 1 minute before opening the orifice) after the opening of the valve between the spin cell and the accumulator. When a non-flammable spin agent was employed, the flash-spun product was collected in a stainless steel open mesh screen basket. When flammable spin agents were used, the flash spun product was collected in a nitrogen-purged stainless steel enclosure. The pressure just before the spinneret was measured with a pressure transducer (11, Dynisco Inc. of Norwood, Mass.) and recorded during spinning. It is referred to as "the spin pressure". The spin pressure was recorded using a computer and was usually about 150 psi (1 MPa) below the accumulator set point. The temperature measured just before the spinneret (10) was also recorded during spinning and was referred to as "the spin temperature".

The resultant flash-spun yarns were analyzed for fluorine with two techniques. Surface analysis, to a depth of 5-10 nanometers was obtained via ESCA using a Physical Electronics Inc. Model 5600 LS with a 45° exit angle. The detection limit was ca. 0.5-1 atom percent. Ion chromatography employing a DIONEX 500 Series unit. was used to get quantitative measurements of the total fluorine content in the yarn.

In the following examples, the functional polymer was blended with either Alathon® 7026T high density polyethylene obtained from Lyondell Inc, an isotactic polypropylene obtained from Montell Inc, or Crystar® 5067 polyethylene terephthalate obtained from DuPont. Gel permeation chromatography (GPC) was employed to determine molecular weight distributions of the polymers produced. Differential Scanning Calorimetry (DSC) was performed to determine melting point according to ASTM D-3417-83.

Example 1

50 grams of low density polyethylene (LDPE) (Aldrich cat #42, 779-9) and 500 mL chlorobenzene (Aldrich) were placed under nitrogen into a 1.0 liter three-neck round bottomed flask equipped with condenser, addition funnel, magnetic stirring, and thermocouple. The mixture was heated to 125° C. and, after the polyethylene dissolved, 10 grams of (perfluoroalkyl)ethylene (Zonyl® BN from E.I. DuPont de Nemours and Co. of Wilmington, Del.), which has the formula $H_2C=CH-(CF_2)_nF$, wherein n is mostly 6, 8, 10, and 12, were added. A solution containing 2 grams of t-butyl peroxide (Aldrich) in 20 mL of chlorobenzene was then added drop-wise over a 60 minute period. The reaction mixture was stirred at 125° C. for a total of 8 hours. After cooling the mixture to about 60° C. it was poured into an excess of methanol. The precipitated polymer was filtered off, washed with methanol, and then dried under vacuum at 75° C. overnight. 58.8 grams of a white polymer were obtained.

Elemental analysis of a sample indicated that the material contained 11.2 weight % of fluorine. GPC in trichlorobenzene at 135° C. gave Mn=6600 and Mw=34100. DSC of the polymer at 20° C./min showed a melting transition at 95° C.

Example 2

The same procedure described in Example 1 was used except that 50 grams of Zonyl® BN were used. After isolation and drying under vacuum, 97 grams of polymer were obtained. Elemental analysis of this sample indicated that the material contained 34.3 weight % of fluorine. GPC in trichlorobenzene at 135° C. showed a bimodal MW distribution with Mn=2800 and Mw=44200. DSC of the polymer at 20° C./min showed a melting transition at 94° C.

Examples 3-9 and Comparative Examples 1 and 2

Preparation of Plexifilamentary Yarns

The polymers of Examples 1 and 2 were each blended with Alathon® 7026 in Freon-11 (F-11) and flash spun according to the procedures hereinabove described to form plexifilimentary yarns. Results are shown in Table 1.

TABLE 1

Plexifilamentary Yarns Comprised of Zonyl ® BN-Graft Low Density Polyethylene

| Example | Graft Polymer | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Comparative Example 1 | None | 12 | 0 | 191 | 975 | — | 0 |
| Comparative Example 2 | None | 12 | 0 | 185 | 925 | 0.0097 | 0.932 |
| Example 3 | Example 2 | 12 | 10 | 190 | 950 | 0.26 | 7.1 |
| Example 4 | Example 2 | 12 | 10 | 185 | 925 | 2.9 | 28.1 |
| Example 5 | Example 2 | 12 | 20 | 190 | 950 | 6 | 48.7 |
| Example 6 | Example 2 | 12 | 20 | 190 | 975 | 6 | 48.9 |
| Example 7 | Example 2 | 12 | 20 | 192 | 900 | 5.1 | 44.6 |
| Example 8 | Example 1 | 12 | 10 | 191 | 925 | 0.82 | 13 |
| Example 9 | Example 1 | 12 | 20 | 190 | 1000 | 1.9 | 29.7 |

Examples 10-13 and Comparative Example 3

Preparation of Plexifilamentary Yarns

The polymers of Examples 1 and 2 were blended in with Alathon® 7026T, but the spin agent was changed to pentane/cyclopentane (60/40 wt./wt.). Plexifilamentary yarns were then spun according to the procedures hereinabove described. Results are shown in Table 2.

TABLE 2

Plexifilamentary Yarns Comprised of Zonyl ® BN-Graft Low Density Polyethylene and Prepared from Alternative Spin Agent

| Example | Graft Polymer | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Comparative Example 3 | None | 18 | 0 | 190 | 1000 | 0.059 | 0 |

TABLE 2-continued

Plexifilamentary Yarns Comprised of Zonyl ® BN-Graft Low Density Polyethylene and Prepared from Alternative Spin Agent

| Example | Graft Polymer | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Example 10 | Example 1 | 18 | 10 | 190 | 1000 | 0.45 | 9.72 |
| Example 11 | Example 1 | 18 | 20 | 190 | 1000 | 1.7 | 25.7 |
| Example 12 | Example 2 | 18 | 10 | 190 | 1025 | 2.4 | 40.4 |
| Example 13 | Example 2 | 18 | 20 | 190 | 1000 | 4.9 | 50.6 |

Example 14

20 grams of Alathon® 7026T and 200 mL chlorobenzene (Aldrich) were placed under nitrogen in a 500 mL three-neck round bottomed flask equipped with condenser, addition funnel, magnetic stirring, and thermocouple. The mixture was heated to 125° C., and after the polyethylene dissolved, 5 grams of Zonyl® BN were added. A solution containing 1 gram of t-butyl peroxide (Aldrich) in 20 mL of chlorobenzene was then added drop-wise over a 60 minute period. The reaction mixture was stirred at 125° C. for a total of 4 hours. After cooling the mixture to about 60° C. it was poured into an excess of methanol. The precipitated polymer was filtered off, washed with methanol, and then dried under vacuum at 60° C. overnight. The polymer was further purified by dissolving it in hot toluene and reprecipitating in methanol. After filtering and drying, 22.6 grams of polymer were obtained.

The fluorine content of this sample was determined to be 11% by ion chromatography. GPC in trichlorobenzene at 135° C. gave Mn=33,000 and Mw=248,000. DSC of the polymer at 20° C./min showed a melting transition at 131° C.

Example 15

The same procedure described in Example 14 was used except that 20 grams of Zonyl® BN were used. After isolation and drying under vacuum, 29.3 grams of polymer were obtained. The fluorine content of this sample was determined to be 21% by ion chromatography. GPC in trichlorobenzene at 135° C. showed a bimodal MW distribution Mn=17,800 and Mw=112,000. DSC of the polymer at 20° C./min showed a melting transition at 131° C.

Examples 16-21

Preparation of Plexifilamentary Yarns

The polymers of Examples 14 and 15 were blended with Alathon® 7026T in F-11. The blends were flash spun according to the procedures indicated above. Results are shown in Table 3.

TABLE 3

Plexifilamentary Yarns Comprised of Zonyl ® BN-Graft High Density Polyethylene

| Example | Graft Polymer | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Example 16 | Example 15 | 12 | 10 | 191 | 950 | 2.1 | 27.9 |
| Example 17 | Example 15 | 12 | 20 | 191 | 925 | 3.9 | 37.3 |
| Example 18 | Example 15 | 12 | 20 | 191 | 950 | 3.9 | 33.1 |
| Example 19 | Example 15 | 12 | 20 | 190 | 1150 | 3.5 | 24.3 |
| Example 20 | Example 14 | 12 | 10 | 190 | 875 | 0.89 | 7.4 |
| Example 21 | Example 14 | 12 | 20 | 190 | 900 | 2 | 11.9 |

Example 22

A 10 gallon stainless steel reactor was charged with 9 L of chlorobenzene, 1 Kg of polyethylene (Aldrich cat. #42, 779-9), and 300 g of Zonyl® BN. After purging the reactor with nitrogen, it was stirred and heated to 125° C. After one hour at this temperature 500 mL of a peroxide solution (0.1 g of t-butyl peroxide/mL) in chlorobenzene were pumped into the reactor at a rate of 10 mL/min. Once the peroxide addition was completed, the reactor contents were further stirred at the same temperature for an additional 4 hours. The reactor was cooled to room temperature and discharged. The reaction mixture was warmed to 60° C. and poured slowly into 12 gallons of methanol to precipitate the polymer. The white polymer obtained was filtered off, washed three times with 4 L of fresh methanol, and dried under vacuum at 60° C. 1.2 Kg of polymer were obtained.

Elemental analysis of a sample indicated that the material contained 15.0 weight % of fluorine. GPC in trichlorobenzene at 135° C. gave Mn=4,700 and Mw=30,200. DSC of the polymer at 20° C./min showed a melting transition at 95° C.

A second batch was prepared following the same procedure described above. Elemental analysis of this second batch indicated that the material contained 16.7 weight % of fluorine. GPC in trichlorobenzene at 135° C. gave Mn=5,400 and Mw=36,200. DSC of the polymer at 20° C./min showed a melting transition at 95° C.

Examples 23-24

Preparation of Plexifilamentary Yarns

The polymers of Example 22 were blended at the wt. % level with Alathon® 7026T in F-11. The blends were flash spun according to the procedures hereinabove described. Results are shown in Table 4.

mixture to about 70° C., it was poured into excess methanol. The precipitated polymer was filtered off, washed with methanol, and then dried under vacuum at 60° C. overnight. The polymer was further purified by dissolving it in hot toluene, filtering the solution through a fritted glass funnel, and reprecipitating into methanol. After filtering and drying under vacuum, 14.5 grams of polymer were obtained. Analysis by NMR showed:

$^1$H NMR (in tetrachloroethane at 120° C., □ in ppm): 4.33 (t, —CH$_2$O—), 3.62 and 3.60 (s, CH$_3$O—), 2.44 (t of t, —CH$_2$—CF$_2$—), 2.31 (m, —CH—), 1.65 to 1.05 (backbone —CH$_2$—).

$^{19}$F NMR (in tetrachloroethane at 120° C., □ in ppm): −80.76 (CF$_3$—), −112.34 (—CF$_2$—), −121.00 (three —CF$_2$—), −121.98 (—CF$_2$—), −122.90 (—CF$_2$—), −125.33 (—CF$_2$).

NMR indicates a 64.3% conversion of methyl acrylate groups to 2-perfluorooctylethyl acrylate giving a copolymer containing approximately 92.5% ethylene, 4.8% 2-perfluorooctylethyl acrylate, and 2.7% methyl acrylate repeat units. GPC in trichlorobenzene at 135° C. gave Mn=19,500 and Mw=91,700. DSC of the polymer at 20° C./min showed a melting transition at 85° C.

TABLE 4

Plexifilamentary Yarns Comprised of Zonyl ® BN-Graft Polyethylene Prepared in Large Scale

| Example | Graft Polymer | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Example 23 | Example 22, first batch | 12 | 20 | 190 | 900 | 2.4 | 22.3 |
| Example 24 | Example 22, second batch | 12 | 20 | 190 | 925 | 2.6 | 22.9 |

Example 25

10 grams of an ethylene/methyl acrylate copolymer containing 20 weight % methylacrylate (E/20MA from E.I. DuPont de Nemours and Co. of Wilmington, Del.), 10 grams of 2-perfluorooctylethanol (a distillation fraction from Zonyl® BA made by E.I. DuPont de Nemours and Co. of Wilmington, Del.), and 50 mL 1,2,4-trichlorobenzene (Aldrich) were placed into a 250 mL three-neck round bottomed flask equipped with condenser, magnetic stirring, thermocouple, and under nitrogen atmosphere. The mixture was heated to 80° C. and when the polymer started to dissolve, 25.0 μL of titanium (IV) butoxide (Aldrich) were added. The mixture was heated to 190° C. and stirred at this temperature for 6 hours under a slow nitrogen flow. After cooling the Examples 26-28

Preparation of Plexifilamentary Yarns

The polymer described in Example 25 was blended with Alathon® 7026T in F-11. The blends were flash spun according to the procedures hereinabove. Results are shown in Table 5.

TABLE 5

Plexifilamentary Yarns Comprised of Graft Ethylene/Methyl Acrylate Copolymer

| Example | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|
| Example 26 | 12 | 10 | 189 | 950 | 2.3 | 21.2 |
| Example 27 | 12 | 20 | 187 | 950 | 3.8 | 32.1 |
| Example 28 | 12 | 30 | 190 | 950 | 6.8 | 34.5 |

Example 29

The same procedure described in Example 25 above was followed except that 16 grams of 2-perfluorooctylethanol and 50.0 μL of titanium (IV) butoxide were used. After isolation and drying under vacuum, 17.5 grams of polymer were obtained.

NMR spectra of this sample were identical to those of Example 25 except in the relative intensity of the signals. According to the $^1$H spectrum, the copolymer contained approximately 93.0% ethylene, 5.8% 2-perfluorooctylethyl acrylate, and 1.2% methyl acrylate repeat units. Elemental analysis of this sample gave 56.05% C, 7.81% H, and 30.72% F which agrees with the NMR results. GPC in trichlorobenzene at 135° C. gave Mn=19,600 and Mw=82,500. DSC of the polymer at 20° C./min showed a melting transition at 85° C.

Examples 30-32 and Comparative Example 4

Preparation of Plexifilamentary Yarns

The polymer of Example 29 was blended with Alathon® 7026T in F-11. The blends were flash spun according to the procedures indicated above. Results are shown in Table 6.

TABLE 6

Plexifilamentary Yarns Comprised of Graft Ethylene/Methyl Acrylate with Higher Fluorine Content

| Example | Graft Polymer | Total Polymer Content (wt. %) | Fraction of Graft Polymer (wt. %) | Spin Temperature (° C.) | Spin Pressure (psi) | Measure F in Fiber Atom (wt. %) | Wt. % F ESCA |
|---|---|---|---|---|---|---|---|
| Comparative Example 4 | None | 12 | 0 | 187 | 950 | BDL | 0.00 |
| Example 30 | Example 29 | 12 | 10 | 192 | 950 | 2.4 | 17.5 |
| Example 31 | Example 29 | 12 | 20 | 189 | 975 | 5.3 | 34.8 |
| Example 32 | Example 29 | 12 | 30 | 190 | 950 | 7.1 | 36.9 |

Examples 33-36 and Comparative Example 5

Heat Treatment Effect on Surface Fluorine

The plexifilamentary yarn from Example 30 was placed between two glass slides. This assemblage was subsequently put on a 5 mm-thick stainless steel plate in intimate contact with a heated "hot plate." The temperature of the hot plate was controlled by a thermocouple placed within the stainless-steel plate. The assemblage was lightly pressed for 30 seconds so as to not deform the sample. The percentage of fluorine on the surface of the thus heat-treated specimen was determined by ESCA. A single, non-heat-treated control specimen was measured twice by ESCA to establish the error in the measurement. Results are shown in Table 7.

TABLE 7

Heat Treatment Effect on Surface Fluorine

| Example | Heat Treatment Temperature (° C.) | % F on surface |
|---|---|---|
| Comp Ex. 5-1 | None | 12 |
| Comp Ex. 5-2 | None | 16 |
| 33 | 100 | 21 |
| 34 | 110 | 23 |
| 35 | 120 | 29 |
| 36 | 130 | 30 |

Examples 37-41 and Comparative Example 6

Surface Fluorine Effect of Contact Angle Measurements

The plexifilamentary yarn from Examples 3, 4, 5, 8, and 9 were individually attached by double-sided tape to glass slides. These slides were placed in turn on the stage of a goniometer. A small drop of a 30/70 (vol/vol) water/ethanol solution was placed on the yarns. The advancing contact angles of these drops were then measured in three places on the yarn and results were averaged. Results are shown in Table 8.

TABLE 8

Surface Fluorine Effect on Contact Angle Measurements

| Example | Yarn Source | Surface fluorine content (atom %) | Advancing contact angle (degrees) |
|---|---|---|---|
| Comparative Example 6 | Comparative Example 2 | 0.6 | 0 |
| Example 37 | Example 3 | 4.6 | 0 |
| Example 38 | Example 8 | 8.7 | 0 |
| Example 39 | Example 4 | 20 | 91 |
| Example 40 | Example 9 | 21 | 106 |
| Example 41 | Example 5 | 38 | 115 |

Example 42

The polymer of Example 15 using F-11 as the spin agent was flash spun according to the procedures indicated above, but without combining it with another flash-spinnable polymer. That is, it was flash spun neat. Results are shown in Table 9.

TABLE 9

Spinning of Neat Zonyl ® BN-Graft High Density Polyethylene

| Polymer in spin agent (wt. %) | Spin Temp. (° C.) | Spin Pressure (psi) | Bulk Concentration of F in Fiber (wt-%) | Surface concentration of F in Fiber (wt-%) |
|---|---|---|---|---|
| 12 | 187 | 1030 | 19 | 39.7 |

Examples 43-44

The polymer of Example 29 was blended at the 20 wt. % level with an isotactic polypropylene with melt flow rate of 1.43, Mn=93,000; Mw=447,000, and molecular weight distribution of 4.77 obtained from Montell Inc. (Example 43) and with Crystar® 5067 polyethylene terephthalate (DuPont) (Example 44). Results are shown in Table 10. Replicates of the surface fluorine measurements are given to show the measurement error.

TABLE 10

Plexifilamentary Yarns Comprised of Graft Ethylene/Methyl Acrylate and Isotactic Polypropylene or Polyethylene Terephthalate

| Example | Spin agent | Polymer in spin agent (wt. %) | Graft Polymer in total polymer (wt. %) | Spin Temp. (° C.) | Spin Pressure (psi) | Bulk Concentration of F in Fiber (wt-%) | Surface concentration of F in Fiber (wt-%) |
|---|---|---|---|---|---|---|---|
| Example 43 | pentane | 10 | 20 | 194 | 800 | 4.3 | 44.8/35.5/39.4 |
| Example 44 | methylene chloride | 25 | 20 | 249 | 2230 | 4.3 | 40.1/40.0/40.1 |

Example 45

10 grams of an ethylene/methyl acrylate copolymer containing 27 weight % methylacrylate, 10 grams of diethylene glycol methyl ether (Aldrich), and 50 mL 1,2,4-trichlorobenzene (Aldrich) were placed into a 250 mL three-neck round bottomed flask equipped with condenser, magnetic stirring, thermocouple, and under nitrogen atmosphere. The mixture was heated to 80° C. and when the polymer started to dissolve, 50.0 µL of titanium (IV) butoxide (Aldrich) was added. The mixture was heated to 190° C. and stirred at this temperature for 6 hours under a slow nitrogen flow. After cooling the mixture to about 90° C., it was diluted with 70 mL of toluene, and then it was poured into excess methanol. The precipitated polymer was filtered off, washed with methanol, and dried under vacuum at 60° C. overnight. The polymer was further purified by dissolving it in hot toluene, filtering the solution through a fritted glass funnel, and reprecipitating into methanol. After filtering and drying under vacuum, 12.2 grams of polymer were obtained. Analysis by NMR showed:

$^1$H NMR (in tetrachloroethane at 120° C., □ in ppm): 4.18 (t, —CH$_2$OOC—), 3.64, 3.59 and 3.49 (t, —CH$_2$—), 3.32 (s, CH$_3$O—), 2.31 (m, —CH—), 1.0 to 1.7 (backbone —CH$_2$—).

NMR indicates a 94% conversion of methyl acrylate groups.

GPC in trichlorobenzene at 135° C. gave Mn=26,300 and Mw=94,700. DSC of the polymer at 20° C./min showed a broad melting transition at 69° C.

Examples 46-47 and Comparative Example 7

The polymer of Example 45 was blended with Alathon® 7026T at increasing concentrations in F-11, and the resultant spin mixtures were flash spun according to the procedure hereinabove described. Results are shown in Table 11.

TABLE 11

Plexifilamentary Yarns Comprised of Graft Ethylene/Methyl Acrylate Copolymer with Oxyethylene Side Chains

| Example | Graft Polymer | Total Polymer Content (wt. %) | Graft Polymer in total polymer (wt. %) | Spin Temperature (° C.) | Spin Pressure (psi) | Bulk Concentration of F in Fiber (wt-%) (wt. %) | Surface concentration of O in Fiber (wt-%) |
|---|---|---|---|---|---|---|---|
| Comparative Example 7 | None | 12 | 0 | 185 | 930 | 0.3 | 3.7 |
| Example 46 | Example 45 | 12 | 15 | 185 | 950 | 1.15 | 7.8 |
| Example 47 | Example 45 | 12 | 30 | 186 | 1010 | 2.99 | 14.1 |

What is claimed is:

1. A plexifilamentary structure formed by flash spinning a spin mixture comprising a polymer blend of: 5 to 30 percent by weight of a functionalized polymer and 70 to 95 percent by weight of an additional polymer;
   wherein the functionalized polymer is selected from the group consisting of polyolefins, copolymers thereof with ethylenically unsaturated monomers, polyesters, and mixtures thereof, said polymer comprising 1 to 25 mol % of functional groups;
   wherein the additional polymer is selected from the group consisting of polyolefins, copolymers thereof with ethylenically unsaturated monomers, polyesters, and mixtures thereof;
   wherein said functional groups form non-fugitive surface modifications on said plexifilamentary structure and said surface modifications exist at an enriched concentration as compared to the bulk concentration of said functional groups.

2. The plexifilamentary structure of claim 1, wherein said non-fugitive surface modifications are present at a concentration of at least 7.1 wt %, as measured by a surface modifying species of said functional group.

3. The plexifilamentary structure of claim 1, wherein said non-fugitive surface modifications are present at a concentration of about ten times higher than the bulk concentration, as measured by the surface modifying species of said functional group.

4. The plexifilamentary structure of claim 1, wherein the additional polymer is polyethylene terephthalate.

5. The plexifilamentary structure of claim 1, wherein the additional polymer is polyethylene.

6. The plexifilamentary structure of claim 1, wherein the functional group is selected from the group consisting of fluoro-olefins, oxyethylenes, disubstituted ethylenes, and vinyl silanes.

7. The plexifilamentary structure of claim 6, wherein the functionalized polymer is grafted with said functional group.

8. The plexifilamentary structure of claim 6, wherein the functional group is a fluoro-olefin radical.

9. The plexifilamentary structure of claim 8, wherein said functional group is a perfluorovinyl ether.

10. The plexifilamentary structure of claim 6, wherein the functional group is oxyethylene trimer.

11. The plexifilamentary structure of claim 6, wherein the functional group is a vinyl silane.

12. The plexifilamentary structure of claim 1, wherein the functionalized polymer is polyethylene terephthalate.

13. The plexifilamentary structure of claim 1, wherein the functionalized polymer is polyethylene.

14. The plexifilamentary structure of claim 1 wherein the functionalized polymer comprises 5 to 15 mol % of functional groups.

* * * * *